Nov. 9, 1965 G. O. KRUEGER ETAL 3,216,516
ADJUSTABLE WEIGHT SENSOR
Filed Oct. 18, 1963 2 Sheets-Sheet 1

INVENTORS
George O. Krueger &
BY Stuart D. Russell

Barnard, McGlynn & Reising
ATTORNEYS

Nov. 9, 1965   G. O. KRUEGER ETAL   3,216,516
ADJUSTABLE WEIGHT SENSOR
Filed Oct. 18, 1963   2 Sheets-Sheet 2
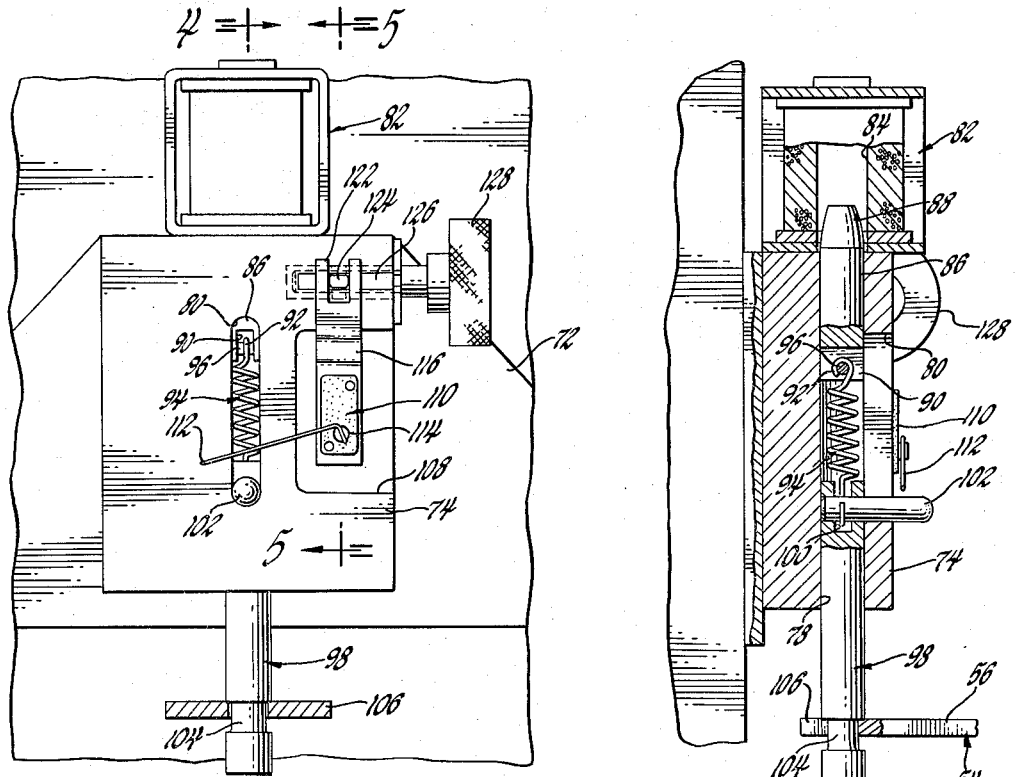
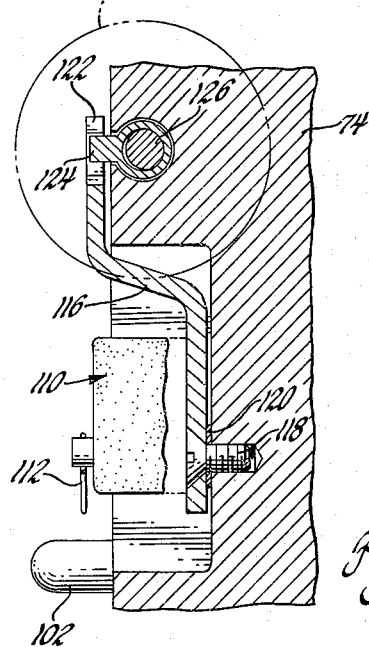
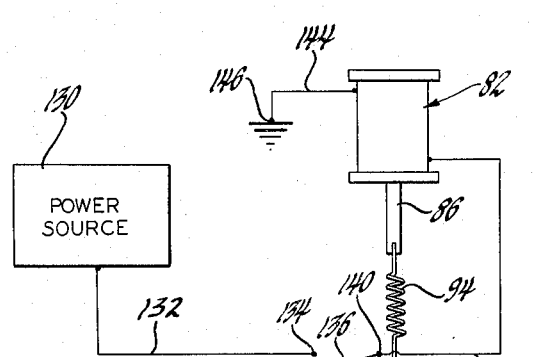
INVENTORS
George O. Krueger &
BY Stuart D. Russell
Barnard, McGlynn & Reising
ATTORNEYS United States Patent Office 3,216,516
Patented Nov. 9, 1965

3,216,516
ADJUSTABLE WEIGHT SENSOR
George O. Krueger, Littleton, and Stuart D. Russell, Denver, Colo., assignors to Controlls, Inc., Littleton, Colo., a corporation of Colorado
Filed Oct. 18, 1963, Ser. No. 317,165
18 Claims. (Cl. 177—73)

This application relates to weight sensing devices and more particularly to a weight sensing unit adapted to be mounted on a dispensing machine and operable to shut off or stop the dispensing operation of the machine when a particular weight of material has been dispensed.

In the design, manufacture, and operation of dispensing machines it is often desirable to provide means of some sort for determining the amount of material dispensed. It may further be desirable to shut off the machine once a particular amount of material is dispensed. Such dispensing machines are commonly used for many purposes, as soft drink or coffee vending machines and soft ice cream dispensing machines, generally dispensing a material through a spout and into a container. When these machines are used in public places or for sale of the material to the public, it is particularly desirable to provide means which will permit dispensing of exactly the same amount of material with each operation.

In the past, such means have been extremely complicated and cumbersome, if any means were provided at all. For example, with soft ice cream dispensing machines, it has been up to the operator of the machine to determine the correct amount of material dispensed. This leaves considerable room for error and results in an inefficient and uneconomical process. In order to overcome these problems, extremely complicated devices have been used which shut off the machine itself or in some other way provides for flow cut-off. Such devices and schemes are generally built into the machines, making such machines much more complicated and extremely difficult to service and repair. Furthermore, many of these devices shut off the machine completely after each dispensing operation, thus requiring some external type of control to disengage the flow control device and turning on the machine for purposes of mixing and the like.

The device in which this invention is embodied comprises, generally, a weight sensing apparatus which may be easily adapted to existing machines and which is a self-contained unit. The unit includes a solenoid having an armature adapted to be drawn into and maintained in the solenoid during the dispensing operation. A plunger, resiliently coupled to the solenoid, engages a micro-switch which controls the solenoid, the switch being actuated when the dispensing machine is ready to begin its operation. The plunger is connected to the material container, and the weight of the container causes the plunger to separate from the armature through its resilient connection. At the proper point, dependent on the weight of the material in the container, the plunger will actuate the switch to de-energize the solenoid and draw the armature out of the solenoid. The added weight or free movement thus permitted the plunger and armature will close the flow control on the dispensing machine in such a manner as to provide a clean shut off and to place the exact predetermined amount of material in the container.

The device is exceedingly simple to manufacture and install on dispensing machines of the general nature described. It is positive in its operation and permits the exact amount of material to be dispensed with each dispensing operation of the machine. The device may be adjusted to provide more or less material dispensed with each operation, depending upon the adjustment setting made by the operator. The result is an extremely efficient and economical dispensing operation, taking the determination out of the realm of the operator himself and accomplishing the function automatically.

These and other advantages will become more apparent from the following description and drawings in which:

FIGURE 3 is an elevational view of the weight sensing unit taken substantially along the line 3—3 of FIGURE 2 and looking in the direction of the arrows.

FIGURE 4 is a cross sectional view of the weight sensing unit of FIGURE 3 taken substantially along the line 4—4 of FIGURE 3 and looking in the direction of the arrows.

FIGURE 5 is a cross sectional view of a portion of the weight sensing unit illustrated in FIGURES 3 and 4 taken substantially along the line 5—5 of FIGURE 3 and looking in the direction of the arrows, to illustrate the adjustment means for the switch.

FIGURE 6 is a schematic wiring diagram illustrating the electrical circuit involved in the weight sensing unit.

Figure 1:
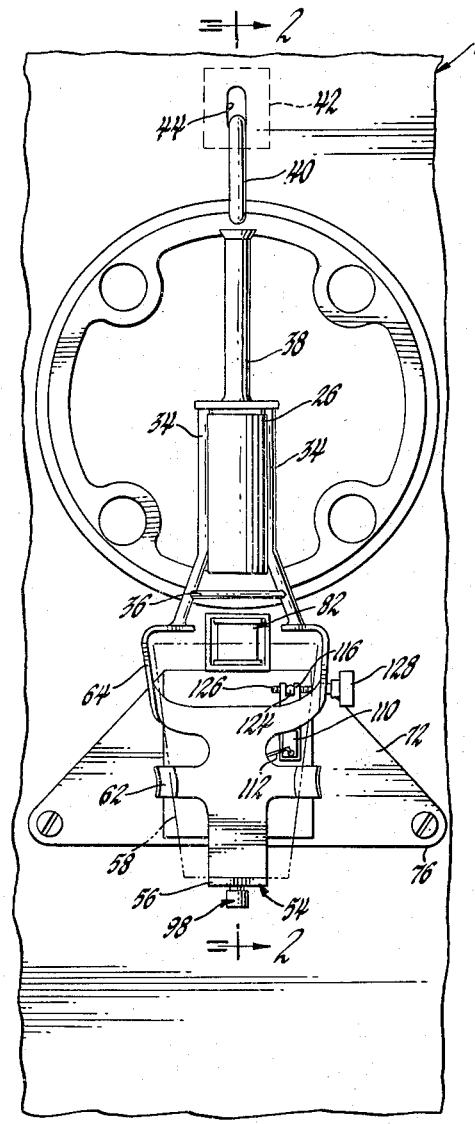
FIGURE 1 is a front view of a typical dispensing machine showing the position of the various parts adjacent the dispensing spout.
Figure 2:
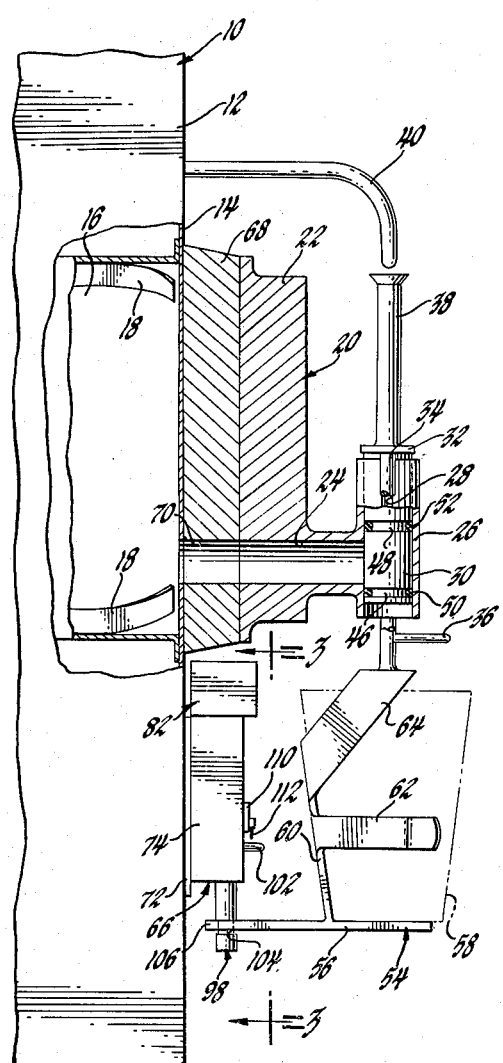
FIGURE 2 is a view with parts broken away and in section of the machine illustrated in FIGURE 1, taken substantially along the line 2—2 of FIGURE 1 and looking in the direction of the arrows.

Referring now to the drawings and more particularly to FIGURES 1 and 2, a typical dispensing machine, illustrated generally by the numeral 10, is shown. For purposes of illustration and description, the dispensing machine shown in the drawings is of the type that dispenses soft ice cream. It is to be understood, of course, that the invention is also readily adaptable to dispensing machines dispensing materials other than soft ice cream or operating in a different manner than the machine illustrated and described.

Dispensing machine 10 includes a housing or cover 12 having a front wall 14 and enclosing a beater chamber 16 where the material is mixed. Disposed within the beater chamber 16 are a plurality of beaters 18 which are suitably mounted and which are operable to mix up the batch of ingredients forming the soft ice cream to be dispensed.

Secured to the front wall 14 of the housing 12 is a spout construction, illustrated generally by the numeral 20. A mounting block 22 is secured in some suitable manner to the front wall 14 of the housing 12 and has a lateral passage 24 formed therethrough which communicates with the beater chamber 16 in the machine 10. At the opposite end of the passage 24 is formed an open ended cylinder 26 into which the passage 24 communicates. Cylinder 26 may be integrally formed on the block 22 or may be secured thereto in some suitable manner. Exteriorly of the cylinder 26 are a pair of diametrically opposed grooves 28.

Disposed within the cylinder 26 is a piston member 30 which serves as a flow control for the machine. Piston 30 extends through the cylinder 26 and upwardly thereof is provided with a flange 32. Extending from flange 32 are a pair of diametrically opposed yoke arms 34 which are received in the grooves 28 formed in the cylinder 26. As will hereinafter become more apparent, piston 30 is adapted to slide or reciprocate in the cylinder 26 and is properly held in location by the yoke arms 34 sliding in the grooves 28. Disposed across the base of the yoke arms, which may bend slightly outwardly as viewed in FIGURE 1, is a handle 36, to manually raise the piston 30 in the cylinder 26 when it is desired to go through a dispensing cycle. At the upper end of piston 30 is an extension 38, extending upwardly from the flange 32 and adapted to engage a switch arm 40. Arm 40 operates a suitable switch 42 to turn on the driving means for the beaters 18. Switch arm 40 may extend through the front wall 14 of the housing 12 by means of a suitable slot 44 adjacent the mounting of switch 42.

Within the cylinder 26, piston 30 is provided with a pair of annular grooves 46 and 48 which receive and suitably retain "O" rings 50 and 52, respectively. The rings seal the piston in the cylinder to prevent the inadvertent flow of material upwardly or downwardly past the piston 30 when the machine is not operating to dispense material.

Suitably secured to the outwardly flaring ends of the yoke arms 34 is a container holder, illustrated generally by the numeral 54. Container holder 54 includes a supporting base 56 on which rests a suitable container, such as the cup illustrated in dashed and dotted lines at 58 in FIGURE 2. Extending upwardly from base 56 is a back support 60, provided with forwardly extending arms 62 to suitably receive the container 58, and with forwardly and upwardly extending arms 64 which are suitably secured to the yoke arms 34. It is apparent that a container 58 placed on the base 56 and clamped in place by the arms 62 will receive the material dispensed from the lower open end of cylinder 26 when the piston 30 is raised to a dispensing position.

In order to adapt the machine 10 to the weight sensing device or unit, illustrated generally by the numeral 66, a spacer block 68 may be required between the block 22 and the front wall 14 of the housing 12. If such block is necessary, a suitable passage 70 is provided which aligns with and communicates between the passage 24 and the beater chamber 16.

Referring now more particularly to FIGURES 3 through 5, the weight sensing unit 66 will be more particularly described. The weight sensing unit 66 is suitably mounted on the front wall 14 of the housing 12, and it may be desirable to provide a mounting plate 72 to which the mounting block 74 is suitably secured. Plate 72 may be secured to the machine in any suitable manner as by screws or bolts 76. Since the entire weight sensing unit is supported on the plate 72 and on the mounting block 74, it is seen that it is a simple matter to adapt the unit to any dispensing machine for the purposes to become hereinafter more apparent.

Mounting block 74 is provided with a longitudinal passage 78 extending completely therethrough. Formed in the block 74 and communicating with the bore 78 is a slot 80, the purpose for which will become hereinafter more apparent.

Mounted on block 74 and in alignment with the bore 78 in the block 74 a suitable solenoid, illustrated generally by the numeral 82, is secured. Solenoid 82 may be of any conventional type, and it is preferred that the central core or opening 84 be aligned with the bore 78 in the block 74. Slidably disposed in the bore 78 of the block 74 is an armature 86, adapted to be received in the central opening of the solenoid 82. Armature 86 may be provided with a conical or partially spherical end 88 if desired, to ease entry and removal from the solenoid 82. At the opposite end of armature 86 and within the bore 78 is a slot 90 to receive the end 92 of a spring 94, the purpose for which will become more apparent as the description proceeds. In order to secure the spring end 92 in the slot 90, a cross pin 96 may be provided extending through the armature 86 and suitably secured therein.

Also disposed in bore 78 and extending from the opposite end thereof, is a plunger, illustrated generally by the numeral 98. Plunger 98 is provided with a slot 100 at its upper end in a manner similar to that of armature 86, and a pin 102 extends transversely of the plunger 98 and out of the mounting block 74 through the slot 80. At the lower end of plunger 98 is a portion of reduced diameter 104 which receives the slotted end 106 of the container support base 56. The connection is such that as the container support 54 and the container 58 move upwardly or downwardly with piston 30, the plunger 98 will move with the container.

Mounted adjacent the bore 78 in the block 74 and, if desired, in a recess 108 formed in the block 74, is a two position micro-switch, illustrated generally by the numeral 110. Switch 110 may be of any conventional type with spring biasing means to hold the switch in one of its two positions. An operating lever 112 extends from the operating pin 114 and, as noted in FIGURE 3, the lever 112 extends across the slot 80 formed in the block 74. With pin 102 extending out of the block 74 through the slot 80 it is apparent that the pin will contact the actuating arm 112 and thus actuate switch 110 as the pin moves up and down in the slot.

Also located in the recess 108 is an adjusting arm 116. Arm 116 is pivotally mounted in the block 74 in any convenient manner, such as through the screw connection 118. A suitable washer 120 may be provided to permit the pivotal movement of the arm 116. Switch 110 is secured to the arm 116 in any convenient manner, and as the arm 116 pivots, switch 110 will pivot as well to change the position of the actuating lever 112 relative to the pin 102.

The upper end of arm 116 is bifurcated, as at 122, to receive a screw follower 124 suitably received about a threaded stud 126. Stud 126 is mounted in the block 74 and is provided with a rotating knob 128 suitable to rotate the threaded stud 126 and advance the follower 124 along the stud 126. It is apparent that upon movement of the follower in either direction along the threaded stud 126 the position of the lever 116 will be changed, thus changing the position of the actuating lever 112 relative to the pin 102.

Referring next to FIGURE 6, a schematic wiring diagram is shown for the weight sensing unit 66. A suitable power source 130 is provided and which is connected by a wire 132 to a terminal 134 in the switch mechanism 110. The switch arm 136 is spring biased by a spring 138 into one of its two positions and for purposes of illustration arm 136 is shown to be held in a normally open position. Actuating the switch arm 136 is the pin 102 extending from the block 74. Pin 102 is connected by the spring 94 to the armature 86 of the solenoid 82. At the opposite switch contact 140 a wire 142 extends to the solenoid 82, and a suitable wire 144 extends from the opposite end of the solenoid coil to a ground connection at 146 to complete the circuit. It is apparent from the diagram that when the switch 136 is engaged with the contact 134, the solenoid 82 will be energized and the armature 86 will be drawn thereinto. When the switch arm 136 pulls away from the contact point 134, the solenoid 82 will be de-energized and the armature 86 will be ejected from or dropped from the solenoid.

The operation of the dispensing machine, so far as it is pertinent, and the operation of the weight sensing unit are as follows: When the operator desires to dispense the material, a suitable container 58 is mounted on the container support 54 and the parts are generally in the position shown in the figures of the drawings. Assuming the beater chamber 16 to have sufficient material therein to dispense, the operator raises the container and the container support 54 by means of the handle 36. This action raises the piston 30 in the cylinder 26, and the extension 38 comes in contact with the switch arm 40. The switch arm actuates the beaters, which are so constructed as to cause the material to flow through the passage 70–24, through the cylinder 26 and below the piston 30 and into the container 58. At the same time, as the container support 54 is raised, the plunger 98 in the weight sensing unit 66 is also raised and the pin 102 engages and raises the lever arm 112 of the switch 110. This energizes the solenoid 82 to draw the armature 86 into the central opening 84 and as long as the solenoid 82 is energized, the armature 86 will be maintained therein.

As the material is dispensed from the cylinder 26 into the container 58, the weight of the material being added causes the container and the container support 54 to slowly move downwardly through the force of gravity. This pulls piston 30 downwardly along with the container support to gradually cut off the opening or passage 24 into the cylinder 26. In the weight sensing unit, plunger 98 and pin 102 are also moving gradually downwardly, along with the container support 54, against the force of the spring 94 connecting the plunger 98 to the armature 86. The spring 94 extends because of the increasing weight in the container 58 until it reaches a point where the pin 102 returns the switch 110 to its de-energizing position by disengagement from the lever 112. At this point the solenoid 82 is de-energized and the armature 86 is released. Since there is now nothing holding the container 58, the container support 54, and the plunger 98 in an upward position, the weight of all of these members plus the weight of the material act directly on the piston 30. The speed of the fall increases and the piston 30 cleanly closes the passage 24 and cuts off the remaining material dispensing therefrom.

It is apparent that with the proper selection of the spring 94 for a particular range of desired weights of material an exact predetermined amount will be dispensed each time the machine is cycled. It is apparent the distance of movement or extension of the spring 94 relative to the switch lever 112 must be less than the distance of travel of the piston 30 within the cylinder 26. However, it is desirable to have the piston 30 fairly close to complete closure of the passage 24 when the solenoid 82 is de-energized in order to permit free fall of the piston 30 within the cylinder 26 without excessive interference from the material in the spout construction.

Should it be desired to change slightly the weight of material necessary to de-energize solenoid 82, a vernier adjustment is provided by the lever arm 116 which is pivotally mounted in the block 74. By turning the knob 128 in a suitable direction, follower 124 causes the arm 116 and the switch 110 to pivot relative to the pin 102 in the block 74. This will change the position of the lever 112 so that the pin 102 will disengage or actuate the switch at a different distance of extension of the spring 94. Of course, if major adjustment is required in the amount of material to be dispensed, a different spring must be provided which has a compatible spring rate or rate of extension with the result required.

Thus, a weight sensing device is provided for a dispensing machine which may be constructed as a unit and which may be mounted on existing dispensing machines or easily adapted to be added or removed as desired. The weight sensing device is positive in its operation and is extremely simple in construction. There are relatively few moving parts, and those parts that are moving are of such construction that wear or damage is not a problem. The device is adjustable over a wide range of weights desired and provides a means for making the dispensing of the material an economical and efficient operation.

We claim:

1. Weight sensing means for a dispensing apparatus adapted to dispense a material and comprising:
    a solenoid;
    means operatively connected to said solenoid for energizing said solenoid;
    an armature adapted to be drawn into and maintained in said solenoid when said solenoid is energized;
    and a plunger engageable with said energizing means for actuating said means and energizing said solenoid when said apparatus is dispensing said material, said plunger being resiliently connected to said armature and movable relative thereto as said material is dispensed for disengagement from said energizing means to de-energize said solenoid when said plunger travels a predetermined distance relative to said energizing means, said predetermined distance being dependent on the weight of material dispensed.

2. The weight sensing means of claim 1 wherein said energizing means includes a switch.

3. The weight sensing means of claim 2 wherein adjustment means are provided to vary said predetermined distance of travel of said plunger relative to said switch.

4. The weight sensing means of claim 1 wherein said solenoid and said armature and said energizing means and said plunger are mounted on a mounting block attachable to said dispensing apparatus.

5. Weight sensing means for a dispensing apparatus adapted to dispense a material into a container and comprising:
    mounting block having a bore therethrough;
    a solenoid;
    means operatively connected to said solenoid for energizing said solenoid;
    an armature adapted to be drawn into and maintained in said solenoid when said solenoid is energized;
    a plunger slidable in said bore in said mounting block and having means thereon for supporting said container, said plunger being engageable with said solenoid energizing means;
    and resilient means coupling said plunger and said armature for maintaining said plunger and said container in a dispensing position when said solenoid is energized and to extend as said container is filled to permit disengagement of said plunger from said solenoid energizing means when said resilient means reaches a predetermined length dependent on the weight of material dispensed into said container.

6. The weight sensing means of claim 5 wherein said solenoid energizing means is adjustable relative to said plunger to permit changing said predetermined length.

7. The weight sensing means of claim 5 wherein said solenoid energizing means includes a switch mounted adjacent said plunger and having a switch lever extending therefrom and engaging said plunger.

8. The weight sensing means of claim 7 wherein said switch is rotatable relative to said plunger to change the position of said switch lever and permit the changing of said predetermined length.

9. The weight sensing means of claim 5 wherein said resilient means includes an extensible spring secured at one end to said plunger and secured at the other end to said armature.

10. Weight sensing means for a dispensing apparatus adapted to dispense a material into a container and comprising:
    a mounting block having a bore therethrough;
    a solenoid;
    an armature adapted to be drawn into and maintained in said solenoid when said solenoid is energized;
    a plunger slidable in said bore in said mounting block;
    means for supporting said container and connected to said plunger, said means being movable with said plunger;
    spring means coupling said plunger and said armature;
    and solenoid energizing means operatively electrically connected to said solenoid and connected to said plunger, said means being actuated by movement of said plunger to energize said solenoid and maintain said armature in said solenoid and said container in a dispensing position, and said means being de-energized when the predetermined weight of said plunger and said container and said container support means and the material dispensed into said container overcome the force of said spring means and said spring means extends a predetermined distance.

11. The weight sensing means of claim 10 wherein said solenoid energizing means includes a switch having an actuating lever extending therefrom, said lever engaging said plunger and being movable thereby between a solenoid energizing position and a solenoid de-energizing position.

12. The weight sensing means of claim 11 and further including an arm pivotally mounted on said mounting block and having said switch secured thereto, said arm being movable to change the position of said actuating lever relative to said plunger to permit changing the predetermined distance of extension of said spring.

13. In combination, a dispensing apparatus and a weight sensing device including:
   a material dispensing spout;
   means for causing material to flow from said spout;
   receiving means adjacent said spout for receiving said material and being movable with respect thereto;
   flow control means for permitting material to flow from said spout;
   a mounting block on said apparatus having a bore therethrough;
   a solenoid;
   means for energizing said solenoid;
   an armature adapted to be drawn into and maintained in said solenoid when said solenoid is energized.
   and a plunger reciprocable in said bore in said mounting block and resiliently connected to said armature and movable with respect thereto, said plunger being secured to said receiving means and being movable therewith;
   said receiving means and said plunger being locatable in a dispensing position with said flow control means permitting material to be dispensed from said spout and with said plunger in actuating engagement with said solenoid energizing means, and upon movement of said plunger and said receiving means with the weight of the dispensed material thereon a predetermined distance, said plunger disengaging from said solenoid energizing means and permitting said flow control means to cut-off flow from said spout.

14. The combination set forth in claim 13 and further including adjustment means engaging said solenoid energizing means to permit adjustment of the position of said solenoid energizing means relative to said plunger for varying the predetermined distance of travel of said plunger.

15. The combination set forth in claim 13 wherein said plunger is connected to said armature by a spring secured at one end to said armature and at the other end to said plunger.

16. The combination set forth in claim 13 wherein said solenoid energizing means includes a switch having an actuating lever extending therefrom and engaging said plunger. Said lever being movable between a solenoid energizing position and a solenoid de-energizing position.

17. The combination set forth in claim 16 and further including an arm pivotally mounted on said mounting block and having said switch secured thereto, said arm being movable to change the position of said actuating lever relative to said plunger for varying the predetermined distance of travel of said plunger.

18. A weight sensing unit for a dispensing apparatus adopted to dispense a material and having material receiving means, said unit comprising:
   a mounting block adapted to be secured to said apparatus and having a bore formed therethrough, said block having a slot therein communicating with said bore;
   a solenoid mounted on said block and having a central opening aligned with said bore;
   an armature slidably received in said bore in said mounting block and adapted to be drawn into and maintained in said opening in said solenoid when said solenoid is energized;
   a plunger slidably received in said bore in said mounting block and spaced from said armature, said plunger being connected to said material receiving means;
   an arm pivotally secured to said block;
   a switch mounted on said arm and movable therewith, said switch being electrically connected to said solenoid and having a first position de-energizing said solenoid and a second position energizing said solenoid, and spring means biasing said switch into said first position;
   a switch actuating lever extending from said switch and across said slot formed in said block;
   a pin extending transversely from said plunger and through said slot and being engageable with said switch actuating lever for moving said switch from its first position to is second position;
   a spring secured at one end to said plunger and at the other end to said armature, said spring having a spring rate permitting said plunger to slide a predetermined distance dependent on the weight of material received in said receiving means and disengaging said pin from said switch actuating lever to de-energize said solenoid and release said armature;
   and means engaging said arm and in said block for pivoting said arm and said switch to change the relative location of said actuating lever relative to said pin and vary the predetermined distance of travel of said plunger and the weight of material necessary to de-energize said solenoid.

References Cited by the Examiner

UNITED STATES PATENTS

| | | | |
|---|---|---|---|
| 399,192 | 3/89 | Gill | 177—73 |
| 1,773,946 | 8/30 | Butler | 177—73 |
| 2,351,606 | 6/44 | Gold et al. | 177—117 |
| 2,489,776 | 11/49 | Hooper | 177—76 |
| 2,828,935 | 4/58 | Ziegler et al. | 177—117 |
| 3,082,832 | 3/63 | Mitthauer et al. | 177—117 |
| 3,108,901 | 10/63 | Cox | 177—118 |
| 3,131,780 | 5/64 | Yarborough | 177—46 |
| 3,137,358 | 6/64 | Jungmayr | 177—81 |

LEYLAND M. MARTIN, *Primary Examiner.*